United States Patent [19]
Dean et al.

[11] Patent Number: 5,396,939
[45] Date of Patent: Mar. 14, 1995

[54] STAVE MACHINE AND METHOD OF STAVE MANUFACTURE

[76] Inventors: John J. Dean, 346 Mansfield St., Springfield, Oreg. 97477; Lloyd M. Wetzig, 2349 Ironwood, Eugene, Oreg. 97402

[21] Appl. No.: 125,301

[22] Filed: Sep. 21, 1993

[51] Int. Cl.$^6$ .............................................. B27H 3/02
[52] U.S. Cl. ....................................... 147/19; 147/30; 147/33; 147/35.5
[58] Field of Search .................... 147/35.5, 31, 27, 30, 147/33, 18, 20, 19

[56] References Cited

U.S. PATENT DOCUMENTS

| | | | |
|---|---|---|---|
| 300,194 | 6/1884 | Beasley et al. | 147/19 |
| 1,062,175 | 5/1913 | Marten et al. | 147/19 |
| 2,673,585 | 3/1954 | Blum | 147/35.5 |
| 2,747,629 | 5/1956 | Blum | 147/35.5 |
| 3,062,251 | 11/1962 | Evans | 147/19 |
| 3,710,836 | 1/1973 | Busch | 147/28 |

*Primary Examiner*—John Husar
*Attorney, Agent, or Firm*—James D. Givnan, Jr.

[57] ABSTRACT

A machine for making staves includes a first section and a second section with each section including components for cutting one side of a blank in a manner inclined to the blank's lengthwise axis. Conveyors on each section are equipped with lugs for propelling the blanks with each lug having a foot to support a lug engaged end of the blank against laterally applied loads imparted by wheel members. Additionally supporting each of the conveyed blanks on each section is a fence on each section with the lug foot and the fence serving to maintain the blank in a skewed position to present a displaced side edge to a cutter head. The fence on the second section additionally supports the blank against lateral loads applied in an opposite direction by wheels biasing the blank into fence and lug engagement to skew in an opposition direction. A cutter head on the second section of the machine completes shaping of the blank by cutting a second side edge inclined to the stave's lengthwise axis. A method of forming tapered articles from rectangular blanks is also disclosed.

15 Claims, 2 Drawing Sheets

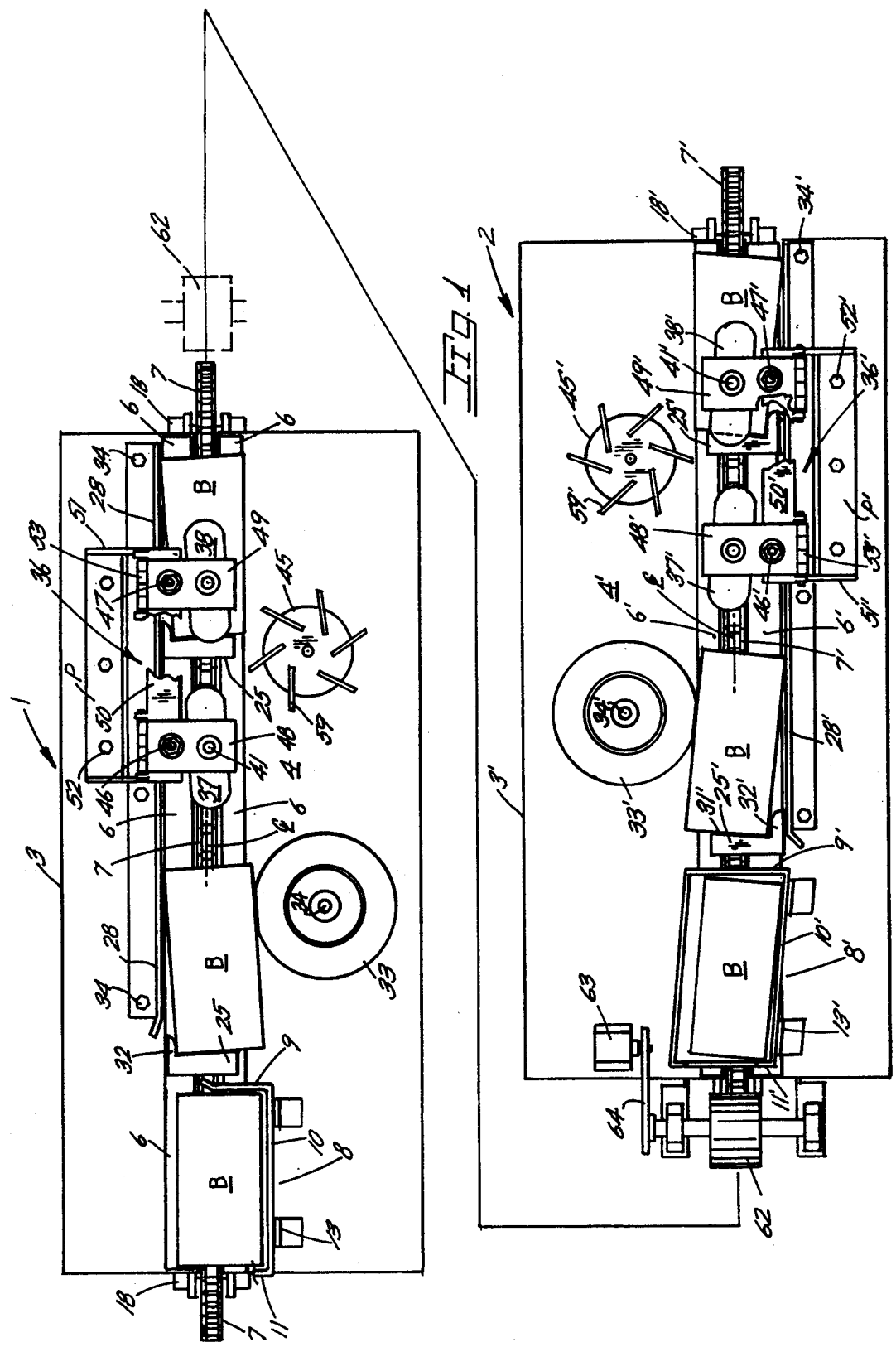

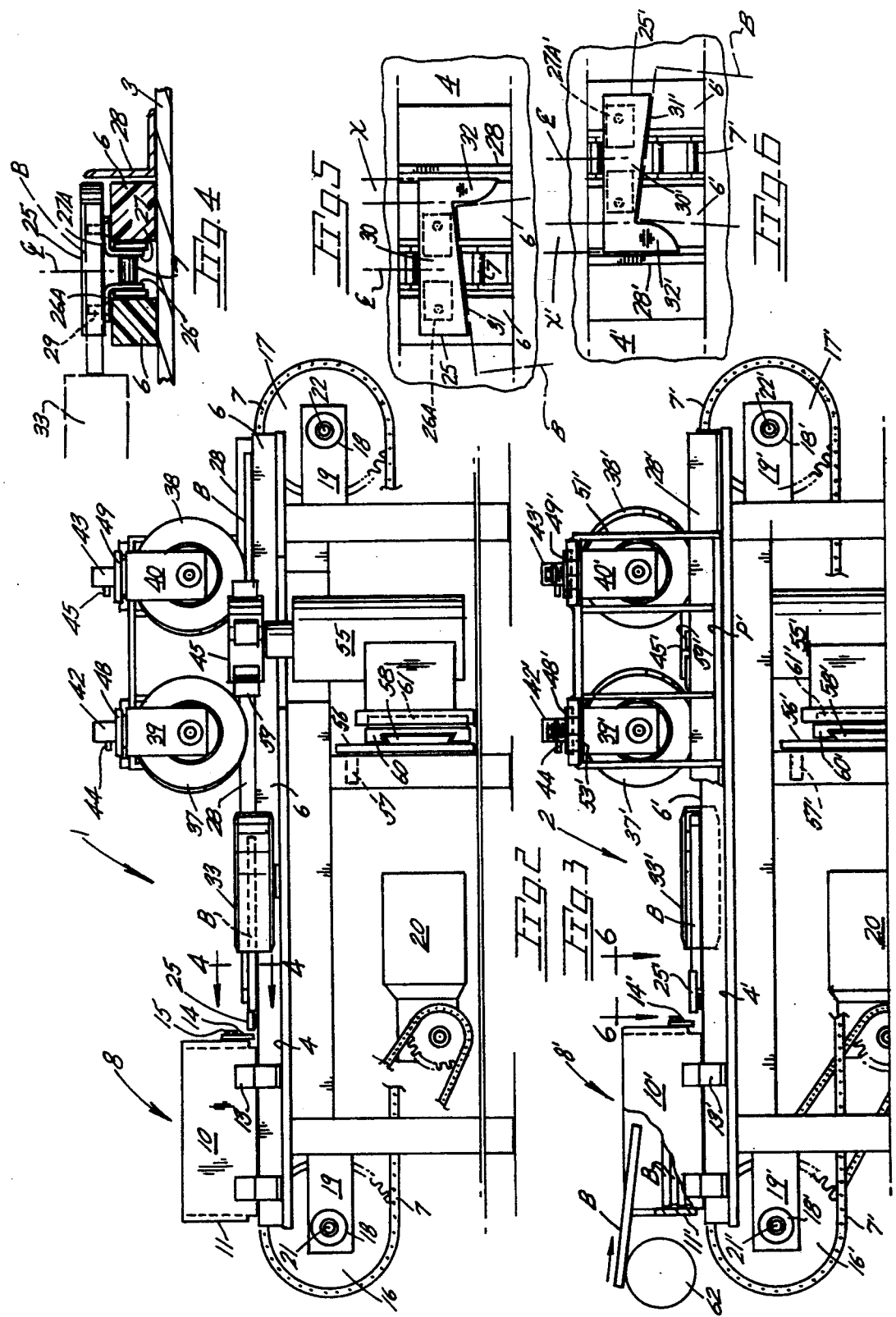

STAVE MACHINE AND METHOD OF STAVE MANUFACTURE

BACKGROUND OF THE INVENTION

The present invention concerns machines for forming the edges of elongate boards.

The production of staves for use in the construction of wooden tubs, planters, etc., of frusto conical shape requires that the staves be formed with non-parallel sides. Prior art staves used in such containers require multiple passes through a saw which is inefficient, particularly when such staves must be manually positioned. Further, the stave uniformity varies when so formed. Typically, tapered staves are sawn along their lengthwise edges to provide planar edge surfaces for abutment with like edges of adjacent staves in the tub or planter. Such planar edges when in abutment with one another are subject to slippage when impacted resulting in collapse of the fragile planter since conventional planters rely on circumposed metal bands applied tightly about the abutting staves making up the tub or planter.

The practice of sawing planter staves to provide a tapered stave configuration results in a by-product of sawdust of little or no value in the marketplace.

SUMMARY OF THE PRESENT INVENTION

The present invention is embodied in a machine for the formation of staves of lengthwise tapered configuration.

The present machine receives wooden pieces or blanks loaded into a magazine from which the pieces which are successively advanced by a conveyor equipped with lugs or dogs at spaced intervals each for propelling endwise engagement with the blank. A way supports the blank for conveyor travel, in skewed fashion, with an edge portion of the blank offset from one side of the way. The remaining side of the blank engages a fence in response to wheel means biasing the blank in a lateral direction. As the blank is advanced by the conveyor it engages crowd rolls which confine the skewed blank as it moves past a powered cutter head. The offset edge portion of the blank is removed by the cutter head to form a first side edge inclined to the blank centerline whereafter the blank is transferred to a subsequent or second section of the machine whereat additional conveyor means including lugs or dogs propelling the blank with the remaining edge portion of the blank offset from a blank supporting way. The blank again engages means urging the blank toward a fence of the second section and toward engagement with a conveyor lug. Conveyor advancement of the blank subjects the blank to crowd rolls which confine the blank in its skewed position as it passes a cutter head which removes the remaining or second edge portion of the blank resulting in a tapered stave. The cutter heads preferably have blades shaped to provide stave side edges with a curved nose and a groove for locking abutment with other staves.

Important objectives of the present machine include the provision of a machine for receiving rectangular blanks and cutting of the side edge of same to provide a tapered stave for assembly into a container; the provision of a machine for the forming of the side edges of a stave with a nose portion and a groove portion which may be interlocked with adjacent panels of a container; the provision of a machine for the automatic and uniform forming of a wooden blank into a stave of tapered configuration and preferably a stave having a nose portion along one edge and a grooved surface extending along the remaining side edge with both side edges formed by cutter heads equipped with shaped blades, the provision of a machine receiving rectangular wooden blanks in a magazine from which the blanks are engaged, one at a time, by conveyor means for imparting travel of the blank along a machine way in skewed fashion so as to expose displaced edge portions of the blank to cutter heads.

BRIEF DESCRIPTION OF THE DRAWINGS

In the drawings:

FIG. 1 is a plan view of the present machine;

FIG. 2 is a side elevational view taken along line 2—2 of FIG. 1;

FIG. 3 is a side elevational view of the machine taken along line 3—3 of FIG. 1;

FIG. 4 is a vertical sectional view of the track and conveyor of the machine taken along line 4—4 of FIG. 2;

FIG. 5 is a plan view of FIG. 4; and

FIG. 6 is a plan view of the machine taken along line 6—6 of FIG. 2.

DETAILED DESCRIPTION OF THE PREFERRED EMBODIMENT

With continuing attention to the drawings wherein applied reference numerals indicate parts similarly hereinafter identified, the reference numerals 1 and 2 indicate generally similar first and second sections of a machine embodying the invention wherein each section has a table 3 has a top surface 4 with like parts of the second section being identified with prime reference numerals when possible.

Mounted in place along the table top 3 are ways 6 which are comprised of spaced apart blocks of material, and preferably of UHMW, with the ways and the table top defining a passageway passage for an endless conveyor chain 7. The blocks forming the ways are securely mounted to table top 3 as by machine screws having their heads recessed into the upper surfaces of the blocks.

A magazine generally at 8 receives blanks B and has walls as at 9, 10 and 11 to initially position and confine stacked blanks on the loading end of ways 6. A magazine outlet for the blanks is provided by wall 9 of the magazine terminating in upward spaced relationship to the ways so as to permit discharge of a single blank propelled by conveyor 7. A flexible keeper at 14 in FIG. 2 is adjustably mounted at 15 to block any superimposed second blank. Brackets at 13 affix the magazine to the table top. The structure of magazine 8' on section 2 of the machine is somewhat different as later explained.

The continuous conveyor 7 is shown as a roller chain entrained on sprockets 16 and 17 carried in bearings 18 on brackets 19. An adjustable speed gear motor 20, in place on table 3, drives a sprocket equipped shaft 21 by means of a driven sprocket. A shaft 22 carries sprocket 17. Motor 20 is of the type permitting synchronizing of the conveyor chains 7 and 7'.

Lugs or dogs 25 at intervals along the chain engage and propel the blanks singly through the machine. Certain links of chain 7 are equipped with pairs of angular plates as at 26 and 27 (FIG. 4) with each of the plates having a horizontal flange 26A–27A to support a lug 25. Lug securement is by flat head machine screws 29 having heads recessed into place within plate flanges. During conveyor operation, the wooden blanks B move along the ways 6 with the plate flanges 26A-27A in sliding contact with the friction reducing material forming the ways.

With attention now to lug configuration on the conveyor chains 7 and 7' on section 1 and section 2 respectively. Each lug 25 has a main body 30 disposed generally transversely of its conveyor chain. A transverse leading edge 31 of the lug is slightly inclined to the conveyor chain axis or centerline. A foot 32-32' on each lug serves to support a trailing corner of a blank against lateral forces during passage of the blank through the machine. The lugs 25 and 25' respectively on the first and second sections of the machine vary for the reason that the lugs 25-25' and specifically the foot 32-32' thereon serve to support opposite trailing corners of the blanks during travel along the machine sections. Further, because the lugs 25' of the second section must compensate for the blank having been reduced in width during their passage through the first section of the machine, the foot 32' will be of greater width as illustrated at X and X' in FIGS. 5 and 6. During blank passage in skewed fashion along the first section of the machine, the trailing end of the blank is offset from one side of the ways 6 while during subsequent passage of the blank along the ways 6' of the second section of the machine, the blank trailing end is similarly offset but in the opposite direction. Such skewing of the blank exposes triangularly shaped edge portions of the blank for removal by following described cutter heads. The forward edge of each lug foot 32-32' is curved to initially engage and skew, if necessary, the wooden blank and support a trailing corner of the blank against laterally applied forces.

The table tops 4 of the first and second section tables are each provided with means for biasing the blanks toward a lug foot 32 and a fence at 28. For such biasing of the wooden blanks crosswise of the conveyor, a pneumatic wheel at 33 is rotatably mounted on an axle 34 to progressively engage a blank side edge to urge a leading corner of the blank against fence 28 and a trailing corner of the blank against the foot 32 of the blank propelling lug. The pneumatic wheels may be under inflated to permit the wheel to achieve the desired effect fully along the blank edge as it passes. Fence 28 is mounted on table top 4 by bolts 34 passing through adjustment slots in the fence base to permit lateral adjustment of the fence, relative ways 6, and affect the extent to which the blank is skewed during cutting for different stave configurations. Additional biasing means is indicated generally at 36 and includes a support structure including a base plate P supporting an elevated platform 50 all being part of a weldment including uprights 51 adjustably mounted on table top 3 by fasteners 52. Wheels 37 and 38 are carried by forks 39 and 40 with each fork having an upwardly projecting spindle at 41. The wheels 37-38 each act on a passing blank and serve to confine the blank against displacement for controlled passage past a cutter head at 45. With further attention to biasing means 36, the wheels 37 and 38 are each in a vertical plane inclined to conveyor 7 to crowd the leading end of a skewed blank toward fence 28 and the trailing end toward foot 32 on a conveyor lug. Additionally, the wheels 37 and 38 confine the blank, during passage by cutter head 45, against upward displacement. For purposes of positioning wheels 37 and 38 to achieve the desired crowding action on the wooden blanks, the wheel spindles 41 are locked to collars at 42 and 43 on plates 48-49 as by screw means 44 and 45. Further, desired downward biasing action of the wheels is accomplished by threaded stems 46 and 47 each projecting upwardly through apertures in hinged plates 48 and 49 with the stems each provided with a nut and washer enabling loading of coil springs (not shown) acting on plates 48 and 49 and, in turn, on the forks and wheels carried thereby. Hinged plates 48 and 49 are each swingably mounted at 53.

With attention now to cutter head 45, the same is powered by an arbor electric motor 55, the shaft of which projects upwardly through an open area in table top 4 structure to permit positioning of cutter head 45 as described below. A base plate 56 is swingably mounted by a pin 57 journalled in table structure 3. Base plate 56 includes a horizontal bed 58 on which is mounted a slide 60 having a vertically orientated bed 61, all of which serve to permit adjustment of motor 55 and cutter head 45 about multiple axes. The circular cutter head 45 is provided with multiple blades 59 each preferably shaped to form one contoured side edge (in section) on the blank. Cutter head 45 may cut a blank side edge with a groove as disclosed in pending U.S. patent application Ser. No. 08/104,778 while the second section cutter head 45' of the machine shapes the remaining side edge of the blank with a nose therealong to form a locking joint between abutting staves per the disclosure of the above noted application. Accordingly, in the preferred embodiment of the present machine, the wooden blanks are shaped by the cutter heads 45 and 45' into a tapered configuration and preferably form interengageable sides on wooden staves to be used in construction of a frusto-conical container.

With attention to FIG. 1, a transfer roll at 62 is driven by a motor 63 and drive 64 to transfer a partially completed stave discharged from section 1 to the magazine 8' of section 2 of the machine. Transfer roll 62 is disposed somewhat below the upper run of the conveyor chain 7 and is driven at a speed to propel the blank forcefully into the magazine 8' of the second section. Magazine 8' is of parallelogram shape in plan view to position the stacked blanks B to locate a trailing corner of the blanks away from the path of the conveyor lug feet 32' to assure contact of a lug leading edge with the trailing end of the blank. The earlier described biasing means assures seating of a trailing corner of the blank with the foot. Magazine 8' is, in similarity to magazine 8, shaped to assure discharge of the blanks in a singular manner.

In the shaping of planar wooden blanks of rectangular shape measuring for example 6 inches by 15 inches it has been found advantageous to locate the magazines 8 and 8' off center of the conveyors 7 and 7' to provide clearance for juxtaposed seating of lug feet 32-32' at a trailing corner of a blank immediately prior to contact of the lug leading edge 31-31' with the blank. To accommodate skewing of the blank said lug edge is canted forwardly 7° or so from the intersection of the edge with the lug foot. In the forming of staves fifteen inches in length with leading and trailing ends of approximately 5½ inches and 4 inches it has been found suitable to locate the blank engaging surfaces of adjustable fences 28-28' about three inches from the conveyor centerline. The lugs 25 and 25' are formed with different foot widths as shown in FIGS. 5 and 6 at X and X' with X being of five eights inch width and the width at X' being one inch.

In the method of forming a stave from a blank of generally rectangular planar shape the following steps are performed. A quantity of blanks are disposed on a first conveyor 7 and advanced in succession by lugs 25. A blank is skewed on the conveyor by the application of laterally directed biasing forces applied to the moving blank while the blank leading and trailing ends are supported in different relationships to the conveyor centerline. Advancing of the skewed blank to present one side edge i.e., the non-supported side edge, to a cutter head to form a first side edge inclined to the major axis of the blank. Subsequently, the blank is deposited on a second conveyor 7' equipped with lugs 25'. The blank is skewed while on second conveyor 7' in an opposite direction to the skewed position on conveyor 7. Biasing forces are laterally applied to the blank while being conveyed while again supporting the blank leading and trailing ends in different relationships to conveyor centerline. Advancing of the skewed blank on conveyor 7' presents a remaining side edge i.e., the non-supported edge, to a cutter head to form a second side edge inclined to the major axis of the blank to form a tapered stave for use in a container of stave construction and of frusto-conical shape.

While we have shown but one embodiment of the invention, it will be apparent to those skilled in the art that the invention may be embodied still otherwise without departing from the spirit and scope of the invention.

Having thus described the invention, what is desired to be secured by a Letters Patent is:

What we claim is:

1. A machine for forming tapered articles from elongate wooden blanks including,
    conveyor means having lugs spaced therealong each for engagement with a blank, ways supporting said blanks, said lugs each having a foot to support said blank against laterally directed loads,
    fences located one each on opposite sides of said conveyor means,
    biasing means located adjacent to said conveyor means and biasing said blanks in sequence toward said fences and toward said foot on each of said lugs,
    said fences and said foot of each of said lugs having blank engaged surfaces spaced different distances from the centerline of said conveyor means resulting in said blanks being successively skewed relative said centerline in opposite directions to offset in sequence side portions of said blank from said ways, and
    cutter heads disposed along and spaced from opposite sides of said conveyor means to remove said portions of said blanks.

2. The machine claimed in claim 1 additionally including magazines for the reception and stacking of said blanks.

3. The machine claimed in claim 2 wherein said magazines are asymmetrically disposed relative said conveyor means.

4. The machine claimed in claim 1 wherein said conveyor means includes separate roller chain conveyors, said foot on each of said lugs of one of said conveyors are of a different width than said foot of each said lug on another of said conveyors.

5. The machine claimed in claim 1 wherein said biasing means includes a wheel for contact with an edge of each said blank to impart a lateral force to said blank.

6. The machine claimed in claim 1 wherein said biasing means includes an elevated wheel above said conveyor means for biasing said blank in a downward direction.

7. The machine claimed in claim 6 wherein said elevated wheel is in an upright plane inclined to the centerline of said conveyor means to additionally bias said blank in a lateral direction toward one of said fences.

8. The machine claimed in claim 1 comprising a first section and a second section with each section including conveyor means, one of said fences, said biasing means and one of said cutter heads.

9. The machine claimed in claim 8 wherein each section additionally includes a magazine for reception of stacked blanks.

10. The machine claimed in claim 8 additionally including blank transfer means intermediate the first section and the second section.

11. The machine claimed in claim 1 wherein said conveyor means includes multiple endless roller chains, said lugs carried by one of said roller chains each having their foot at one extremity of the lug, said lugs carried by another of said roller chains each having their foot at an opposite extremity of the lug.

12. The machine claimed in claim 1 wherein said biasing means includes wheels each rotatable about an upright axis and additional wheels each rotatable about a horizontal axis.

13. The machine claimed in claim 12 wherein said additional wheels are in separate upright planes inclined to the centerline of said conveyor means.

14. The method of forming a tapered planar article from a rectangular blank consisting of the steps of,
    depositing blanks on a first conveyor equipped with lugs for individually propelling said blanks and for supporting same against laterally directed loads,
    biasing each of said blanks in a first lateral direction crosswise of the conveyor centerline,
    asymmetrically supporting the leading end and the trailing end of each of said blanks on said conveyor resulting in said blank being skewed,
    presenting one side of the skewed blank to a cutter head to cut a first side of said blank inclined to said blank major axis,
    depositing said blanks on a second conveyor equipped with lugs for individually propelling said blanks and for supporting same against laterally directed loads,
    biasing each of said blanks in a second lateral direction crosswise of said conveyor centerline,
    asymmetrically supporting the leading end and the trailing end of each of said blanks on said second conveyor resulting in said blanks being skewed, and
    presenting a remaining side of said skewed blank to a second cutter head to cut a second side of said blank also inclined to said blank major axis.

15. A machine for forming tapered staves from rectangular wooden blanks comprising,
    first and second conveyors in series and each equipped with lugs for propelling said blanks, each of the lugs on said first conveyor equipped with a foot to support the trailing end of blanks against loads laterally imparted in a first direction, each of said lugs on said second conveyor equipped with a foot to support the trailing end of said blanks against loads laterally imparted in a second direction, biasing means located adjacent said first and second conveyors and imparting said laterally imparted loads, fences located adjacent said first and second conveyors to support the remaining ends of said blanks against said laterally imparted loads in said first and second direction, said fences offset from the said conveyors resulting in skewing of said blanks on said conveyors, and cutter heads located adjacent said first and said second conveyors to cut off side portions of the skewed blanks.

* * * * *